March 7, 1933.  J. GATTONI  1,900,641
MAGNETIC DAMPER FOR PRECISION BALANCE
Filed May 21, 1932  3 Sheets-Sheet 1
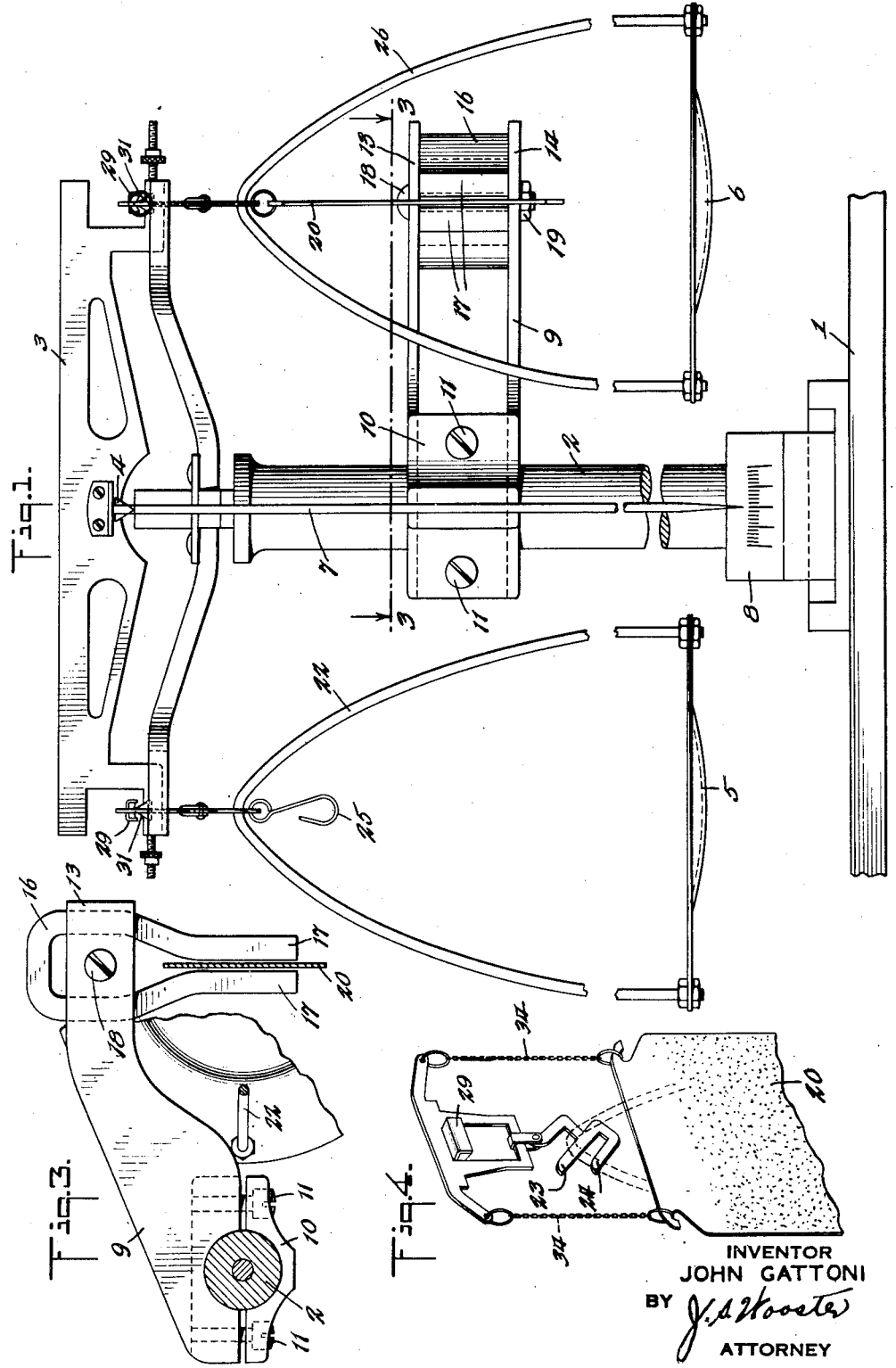
INVENTOR
JOHN GATTONI
BY J.S.Wooster
ATTORNEY March 7, 1933. J. GATTONI 1,900,641
MAGNETIC DAMPER FOR PRECISION BALANCE
Filed May 21, 1932 3 Sheets-Sheet 2
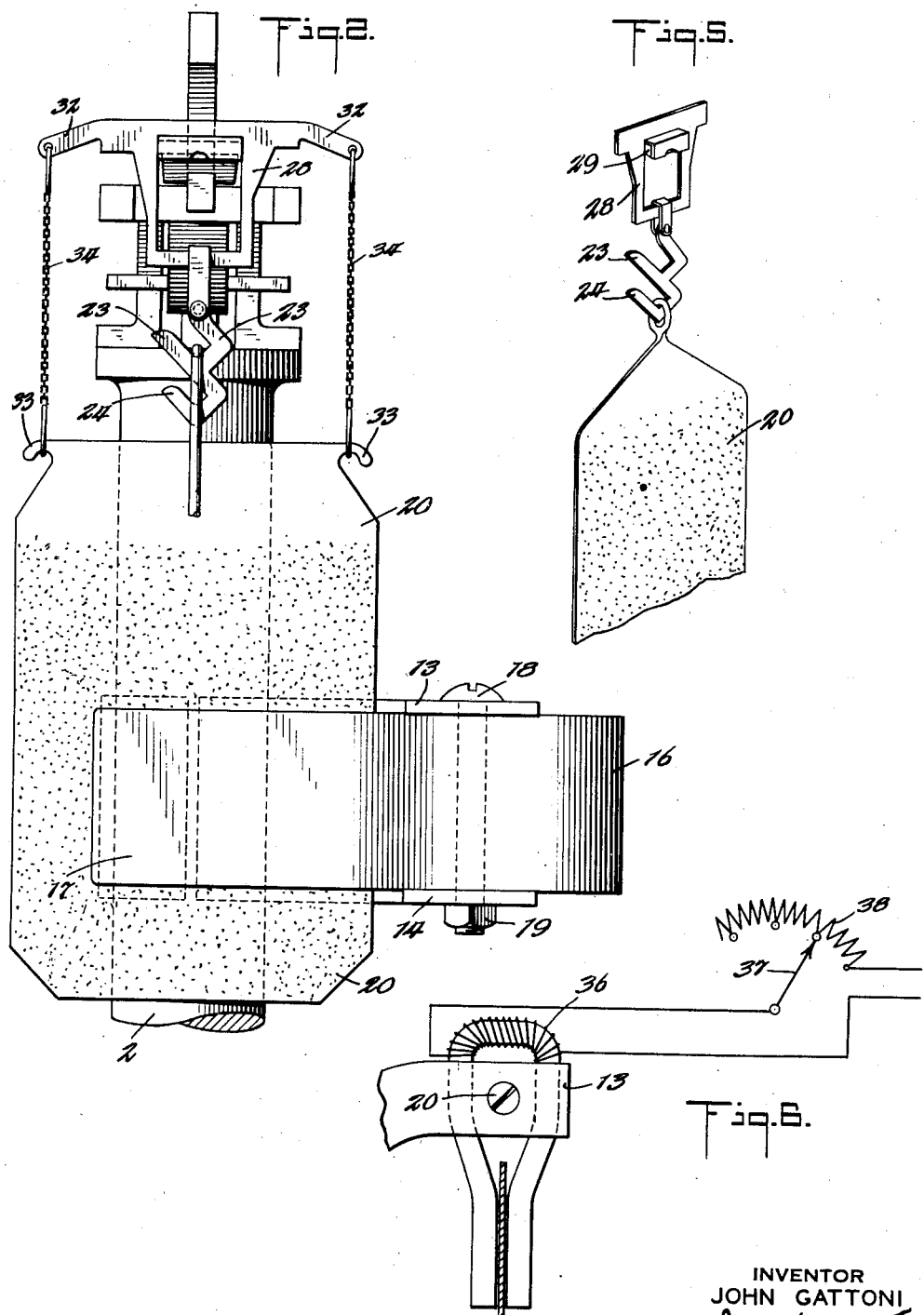
INVENTOR
JOHN GATTONI
BY
ATTORNEY March 7, 1933.  J. GATTONI  1,900,641
MAGNETIC DAMPER FOR PRECISION BALANCE
Filed May 21, 1932  3 Sheets-Sheet 3
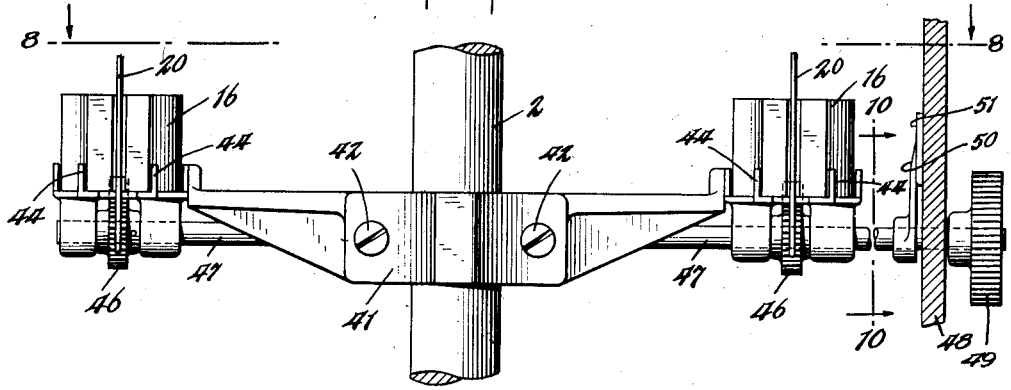
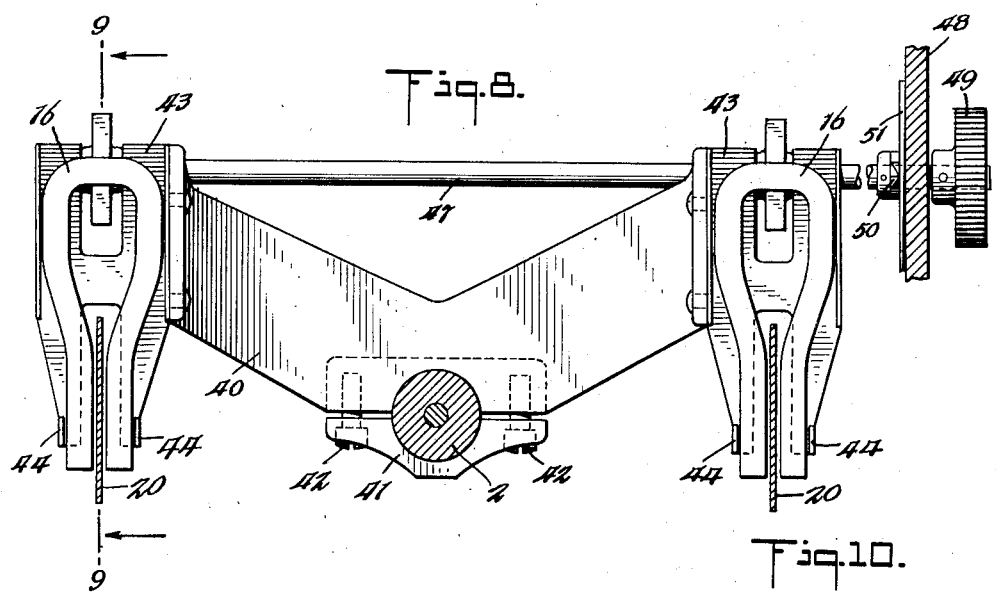
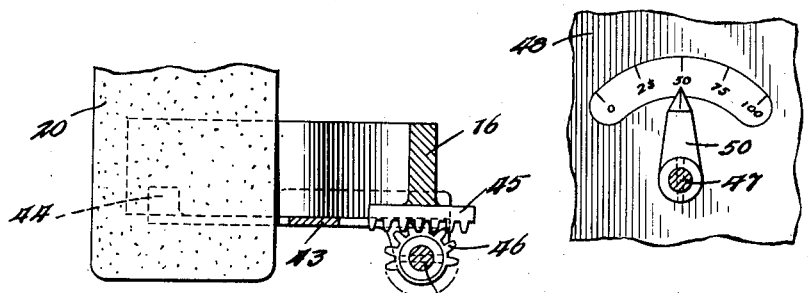
INVENTOR
JOHN GATTONI
BY
ATTORNEY Patented Mar. 7, 1933

1,900,641

UNITED STATES PATENT OFFICE

JOHN GATTONI, OF UNION CITY, NEW JERSEY, ASSIGNOR TO SEEDERER-KOHLBUSCH, INC., OF JERSEY CITY, NEW JERSEY, A CORPORATION OF NEW JERSEY

MAGNETIC DAMPER FOR PRECISION BALANCE

Application filed May 21, 1932. Serial No. 612,742.

This invention relates to improvements in magnetic damper for precision balance and has for its object to provide a practicable construction whereby the vibrations of a delicate precision balance can be dampened as may be desired according to the load, and thereby save time in ascertaining weights.

While the broad idea of supplying a magnetic damper is disclosed in the patent to Gibboney 502,433, and later patents to Craig 1,563,019 and Frayne et al. 1,686,909, such devices, so far as I am aware, have not gone into practical use. There are several objections in practical use to these prior devices such as lack of easy control of the damping effect, variation in damping effect due to variation in load, complexities, etc. In my research, I have found that a damping device which works effectively with, for example, a light load, may have little or no damping effect with a heavy load, or when effective with a heavy load is too heavy for a light load. Also, while the principle of a diamagnetic plate attached to the beam and swinging in a magnetic field is old, this type lends itself very effectively in carrying out the improvements of this invention. According to this invention, an improved suspension of the plate is provided in conjunction with adjustability of the magnet relatively to the plate to vary the damping effect. In one form of the invention an angle-shaped arm is clamped to a support and projects around one side of a bow, which is suspended from a beam and supports a scale pan. The arm carries a magnet, whose poles are preferably in a horizontal plane, and a damping plate is suspended from the beam independently of the scale pan and is vertically movable in the field of the magnet. By such arrangement, the magnet and damping plate do not interfere with the free vertical movement of the scale pan or bow, nor with any objects to be weighed or weights on the scale pan, and swinging movements of the scale pan and bow are isolated from the damping plate. Various other improvements in detail construction and modifications, will now be more fully described:

With reference to the accompanying drawings, Fig. 1 is an elevation of a scale embodying the invention;

Fig. 2 is an end elevation;

Fig. 3 is a detail plan view of the magnet mounting;

Fig. 4 is a detail perspective view of the damping plate and its suspension from the beam;

Fig. 5 is a modification of Fig. 4;

Fig. 6 is a modification showing a variable electromagnet;

Fig. 7 is an elevation of a modified form of adjustable magnet mounting controllable from outside the case;

Fig. 8 is a plan view;

Fig. 9 is a detail view showing the actuating mechanism of the magnet; and

Fig. 10 is a scale for determining the damping effect by shifting the magnet relatively to the damping plate.

1 is a suitable base which in practice will support a glass case to enclose the entire mechanism. 2 is a support, at the upper end of which the beam 3 is mounted on usual knife edge 4. The beam carries the knife edges 31 at its ends on which are hung the scale pans 5 and 6. Also attached to the beam is the usual pointer 7 moving over scale 8.

9 is a magnet supporting arm clamped to support 2 by cap 10 and screws 11, so as to be adjustable vertically as well as horizontally. The end of the arm 9 is divided to provide separated clamping plates 13—14 between which a permanent magnet 16 having poles 17 is adjustably clamped by set screw 18 and nut 19. The ordinary adjustment will be to move the magnet back and forth gradually relatively to the damping plate 20 so as to get the latter symmetrically in the field where maximum damping effect is wanted, and asymmetrical of the field where less damping effect is required. The poles of the magnet are closely spaced to provide a concentration of flux in the path of the damping plate.

The scale pan 5 is supported by a bow 22, which is hung on the upper hook 23 at one end of beam 3 while damping plate 20 is hung on lower hook 24 at the other end of beam 3 as shown in Fig. 5, and if a magnet is only used at one end then the hook 24 above pan 5 will carry a small weight 25 as shown in Fig. 1 to balance the damping plate 20. 26 is the corresponding bow for pan 6 which is hung on hook 23 directly above the hook 24 which carries damping plate 20.

The preferred form of pivoted suspension of the damping plate 20 is shown in Fig. 5 in which the double hook 23—24 is attached to a yoke frame 28 which carries agate bearing 29 to rest on the knife edges 31 at the ends of the beam.

In Figs. 2 and 4 the yoke frame 28 carries extensions 32 from which the damping plate 20 having hooks 33 is pivotally suspended by light chains 34, as little mass as possible being desirable in this moving system.

In Fig. 6 the parts are generally the same except that the magnet is of soft iron instead of hard and is magnetized by coil 36 through switch 37 and rheostat 38 to variably control the magnet field.

In Figs. 7-10 inclusive, a double magnet arm 40 is provided and is clamped to post 2 by cap 41 and screws 42, and at each end is a trackway 43 with guides 44 for the magnet poles, so that the damping effect can be varied on one side where only one damping plate 20, is used, or on both sides simultaneously as in Figs. 7 and 8 by moving the magnets 16 from the damping plates 20. A convenient way of accomplishing this with the mechanism of Figs. 7 and 8 is shown in Fig. 9 wherein the bottom of the magnet carries a short rack 45 with which a pinion 46 meshes. The pinion being on shaft 47 which shaft runs through the side 48 of the case (Figs. 7 and 8) and can be turned by hand wheel 49. In Fig. 10 a pointer 50 moving over scale 51 on the end of case 48 enables the damping effect to be predetermined according to the position of the pointer on the scale, it being found efficient in practice to have five set strengths or predetermined damping effects for the various weighing capacity of a given scale, but more or less can be provided. In this way the magnet or magnets may be moved gradually to vary the operative relationship of the poles with respect to the damping plate or plates and thereby vary the damping effect to any desired extent.

In all forms of the invention the damping plate 20 moves up and down between the poles of the permanent magnet or electromagnet and the eddy currents set up by moving the plate through the field dampen the motion of the beam and quickly bring the pans to rest. In my improved combination the yoke frame supports the damping plate and the scale pan independently of and out of contact with each other so that swinging movements of the scale pan are isolated from the damping plate and cannot force the damping plate against the magnet poles which would seriously affect the sensitivity and accuracy of the balance.

It will be understood that the improvements herein described and shown on only one side of the scale are applicable to both sides, or vice versa, and various modifications and changes may be made without departing from the scope of the invention as indicated in the accompanying claims.

The invention claimed is:

1. In a balance, a support, a beam pivoted thereon, a yoke frame pivotally mounted on said beam, a double hook carried by said yoke frame, a scale pan carried by one of said hooks, a magnet, means securing said magnet to said support, and a damping plate carried by the other of said hooks and adapted to move in the field of said magnet.

2. In a balance, a support, a beam pivoted thereon, a yoke frame pivotally mounted on one end of said beam, a double hook carried by said yoke frame, a scale pan carried by one of said hooks, a magnet, means comprising an arm having a plurality of clamps for securing said magnet to said support and for adjusting said magnet horizontally and vertically, a damping plate carried by the other of said hooks and adapted to move in the field of said magnet, and a weight carried by the other end of said beam to balance the weight of said damping plate.

3. In a balance, a support, a beam pivoted thereon, a scale pan carried by said beam, a magnet, means comprising an arm for adjustably securing said magnet to said support, a trackway having guides carried by said arm and adapted to guide said magnet, and a damping plate carried by said beam and adapted to move in the field of said magnet.

4. In a balance, a support, a beam pivoted thereon, a scale pan carried by said beam, a magnet, means for adjustably securing said magnet to said support, means for guiding said magnet, means for moving said magnet in said guiding means, and a damping plate carried by said beam and adapted to move in the field of said magnet.

5. In a balance, a support, a beam pivoted thereon, a scale pan pivotally carried by said beam, a magnet, means comprising an arm for adjustably securing said magnet to said support, a trackway having guides carried by said arm and adapted to guide said magnet, means comprising a rack and pinion for moving said magnet in said trackway, and a damping plate carried by said beam and adapted to move in the field of said magnet.

6. In a balance, a casing, a support, a beam pivoted thereon, a scale pan pivotally carried by said beam, a magnet, means comprising an arm for adjustably securing said magnet to said support, a trackway having guides carried by said arm and adapted to guide said magnet, means comprising a rack and pinion for moving said magnet in said trackway, a damping plate carried by said beam and adapted to move in the field of said magnet, means outside of the casing for controlling the movement of said magnet, and means for indicating the damping effect.

7. In a balance, a casing, a support, a beam pivoted thereon, scale pans carried by the ends of said beam, a pair of magnets, means comprising a double arm for securing said magnets to said support and on opposite sides thereof, a pair of trackways having guides carried by said double arm and adapted to guide said magnets, means comprising a pair of racks and pinions for moving said magnets in said trackways, a pair of damping plates carried by the ends of said beam and adapted to move in the fields of said magnets, means outside of the casing for simultaneously controlling the movements of said magnets, and means for indicating the damping effect.

8. In a balance, a casing, a support, a beam pivoted thereon, a yoke frame having extensions and being pivotally mounted on said beam, a scale pan and bow carried by said yoke frame, an angle-shaped arm clamped to said support and projecting around one side of said bow, said arm being provided with a trackway and guides, a horizontal magnet carried by said trackway and horizontally movable therein, a vertical damping plate carried by said extensions and adapted to move vertically in the field of said magnet, a rack and pinion for causing said magnet to move horizontally in said trackway, means outside the casing for controlling the movement of said magnet, and means for indicating the damping effect.

9. In a balance, a casing, a support, a beam pivoted thereon, yoke frames having extensions and being pivotally mounted on the ends of said beam, scale pans and bows carried by said yoke frames, an angled-shaped double arm clamped to said support and projecting around one side of said bows, said arm being provided with trackways and guides on opposite sides of said support, horizontal magnets carried by said trackways and horizontally movable therein, vertical damping plates carried by said extensions and adapted to move vertically in the fields, of said magnets, racks and pinions for causing said magnets to move horizontally in said trackway, means outside the casing for simultaneously controlling the movements of said magnets, and means for indicating the damping effect.

10. In a balance, a pivoted beam, a scale pan suspended on said beam, a magnet having closely spaced poles mounted between said beam and said scale pan, and a damping plate pivotally suspended from said beam independently of said scale pan and adapted to move between the poles of said magnet to dampen vibrations of said beam whereby swinging movements of said scale pan are isolated from said damping plate.

11. In a balance, a pivoted beam and a suspended scale pan, a yoke frame pivoted on said beam, a magnet having closely spaced poles mounted beneath said beam, a damping plate pivotally suspended from said yoke frame and adapted to move between the poles of said magnet to dampen vibrations of said beam, and means on said yoke frame for pivotally supporting said scale pan independently of and out of contact with said damping plate whereby swinging movements of said scale pan are isolated from said damping plate.

12. In a balance, a pivoted beam, a scale pan suspended on said beam, a magnet having closely spaced poles mounted between said beam and said scale pan, a damping plate pivotally suspended from said beam independently of said scale pan and adapted to move between the poles of said magnet to dampen vibrations of said beam whereby swinging movements of said scale pan are isolated from said damping plate, and means for gradually varying the operative relationship between said magnet and said damping plate to vary the damping effect.

13. In a balance, a pivoted beam, a scale pan suspended on said beam, a magnet having closely spaced poles mounted between said beam and said scale pan, a damping plate pivotally suspended from said beam independently of said scale pan and adapted to move between the poles of said magnet to dampen vibrations of said beam whereby swinging movements of said scale pan are isolated from said damping plate, and means for gradually moving said magnet to vary the operative relationship of its poles with respect to said damping plate and thereby vary the damping effect.

14. In combination, a yoke frame having a bearing adapted to be pivoted on a balance beam, a damping plate pivotally suspended from said yoke frame, and means on said yoke frame for pivotally supporting a scale pan independently of and out of contact with said damping plate whereby swinging movements of said scale pan are isolated from said damping plate.

15. In combination, a yoke frame having a bearing adapted to be pivoted on a balance beam, chains carried by said yoke frame, a damping plate suspended on said chains, and means on said yoke frame for pivotally supporting a scale pan independently of and out of contact with said damping plate whereby swinging movements of said scale pan are isolated from said damping plate.

16. In combination, a yoke frame having a bearing adapted to be pivoted on a balance beam, a hook carried by said yoke frame, a damping plate pivotally suspended on said hook, and a second hook carried by said yoke frame and adapted to support a scale pan independently of and out of contact with said damping plate whereby movements of said scale pan are isolated from said damping plate.

Signed at New York in the county of New York and State of New York this 20th day of May, A. D., 1932.

JOHN GATTONI.